United States Patent [19]
Kuhn

[11] 3,764,187
[45] Oct. 9, 1973

[54] THRUST BEARING ASSEMBLY

[75] Inventor: Earl C. Kuhn, Verona, Pa.

[73] Assignee: Westinghouse Electric Corporation, Pittsburgh, Pa.

[22] Filed: June 21, 1972

[21] Appl. No.: 265,025

[52] U.S. Cl. .............................................. 308/160
[51] Int. Cl. ......................................... F16c 17/03
[58] Field of Search..................... 308/160, 73, 168, 308/172

[56] References Cited
UNITED STATES PATENTS
3,018,144  1/1962  Baudry et al. ..................... 308/160

*Primary Examiner*—Charles J. Myhre
*Assistant Examiner*—Frank Susko
*Attorney*—A. T. Stratton et al.

[57] ABSTRACT

A thrust bearing assembly for large vertical bearings of the pivoted pad type. The assembly includes supporting means for supporting a bearing pad on its pivot in a manner which substantially eliminates any distortion of the bearing surface of the pad from a plane surface in either the circumferential direction or the radial direction of the bearing.

12 Claims, 9 Drawing Figures

THRUST BEARING ASSEMBLY

BACKGROUND OF THE INVENTION

The present invention relates to thrust bearing assemblies for vertical shafts and more particularly to a large thrust bearing assembly of the pivoted pad type.

Large thrust bearings for the vertical shafts of machines such as water wheel generators are usually of the type in which a thrust runner on the shaft is supported on a plurality of segmental bearing pads which are pivotally mounted to permit the pads to tilt slightly to establish a wedge-shaped oil film. These bearings are designed hydrodynamically to support rleatively high loads, but the load capacity of the bearing is reduced when the surface of the bearing pad becomes distorted from a plane surface. In the case of a large pivoted pad bearing, the pads may have an area of the order of 3 or 4 square feet and if the bearing pad is supported directly on a pivot, the entire support is concentrated in a very small area at or near the center of the pad. The resultant load on the bearing surface is also concentrated at this support point, or small area, and with this concentrated load and support, relatively large distortions or deflection of the bearing pad can occur with consequent reduction of load capacity. Such distortion can be prevented or minimized only by making the pad extremely thick so as to obtain sufficient rigidity to prevent substantial distortion. This is highly undesirable, however, because of the great difficulty in manufacturing and handling such bearing pads due to the excessive size and weight necessary to obtain the desired degree of rigidity.

In order to overcome this difficulty, it has been proposed to support bearing pads on their pivots by means of supporting structures placed between the pads and the pivots and designed to distribute the load more uniformly, or to support the pad at a plurality of points or regions, so as to minimize distortion of the bearing surface without requiring excessively thick pads. Such supporting structures are shown, for example, in Baudry U.S. Pat. Nos. 3,018,144 and 3,423,139, and Latham et al. U.S. Pat. No. 3,271,088. The bearing pad supports heretofore proposed, however, have involved relatively difficult manufacturing problems and while they greatly reduced distortion of the bearing pad surface, they could not entirely eliminate distortion due either to the mechanical load applied to the pad or to thermal gradients in the pad. As the requirements for physical size and loading of these large bearings have increased, the types of bearing pad supports previously used have become inadequate and an improved support which will substantially eliminate distortion of the bearing surface is needed.

SUMMARY OF THE INVENTION

In accordance with the present invention, there is provided a pad supporting structure for thrust bearing pads which essentially eliminates distortion or deflection of the pad surface from a plane due to the mechanical loading, and also if desired, distortion due to thermal gradients, and which is relatively simple to manufacture and assemble.

In general, the new pad supporting structure consists of a base member having a bottom plate portion resting on the pivot and carrying two generally radial elastic portions. The support beams rest on the elastic portions and each beam has two narrow contact portions extending radially and directly supporting the bearing pad. Thus, the pad is supported on four substantially parallel supports which are disposed in such a manner that the reaction forces substantially balance the loads, so that the forces and moments on the pad are in equilibrium and result in substantially zero deflection of the pad in the circumferential direction. The elastic supports on which the beams rest vary in elasticity in the radial direction in a manner to compensate for deflection of the base plate so that the pad has essentially no distortion in the radial direction. Thus deflection of the pad surface in both radial and circumferential directions is essentially zero, and the pad bearing surface remains plane so that its load capacity is not reduced by distortion of the bearing surface. Any distortion of the surface due to thermal gradients in the pad can also readily be compensated for in the design so that no thermal distortion occurs.

BRIEF DESCRIPTION OF THE DRAWINGS

The invention will be more clearly understood from the following detailed description taken in connection with the accompanying drawings, in which.

DESCRIPTION OF THE PREFERRED EMBODIMENT

Figure 1:
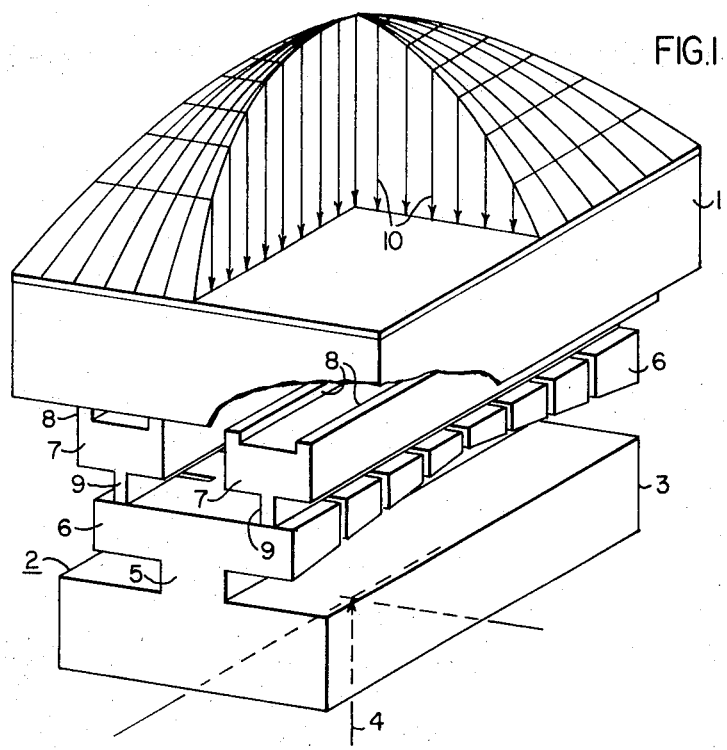
FIG. 1 is a diagrammatic perspective view of a single bearing pad and its support illustrating the principles of the invention.

As previously indicated, the invention provides a support for the bearing pads of a pivoted pad thrust bearing which substantially eliminates any distortion or deflection of the bearing pad in either the radial or circumferential direction. The new bearing pad support is illustrated diagrammatically in FIG. 1, which shows a support structure for supporting a bearing pad 1 on a pivot. It will be understood of course that a complete bearing would include a plurality of bearing pads 1 arranged in a circle around the shaft to engage a thrust runner, each of the pads having its own support and pivot. The support structure includes a base member 2 having a bottom plate portion 3 which rests on a fixed pivot approximately at its center as indicated at 4. The bottom plate 3 is preferably relatively rigid and it carries, through a central portion 5 of the base member, two elastic support portions 6 extending generally radially for substantially the full radial length of the bearing pad 1. The elastic portions 6 may be in the form of wings, as shown, projecting from the central portion 5 with which they are integral, and they are of greater elasticity or flexibility than the relatively rigid bottom plate 3. The elastic portions 6 vary in elasticity in the radial direction as will be more fully discussed hereinafter.

A beam 7 is supported on each of the radial elastic portions 6. Each of the beams 7 has two substantially parallel, relatively narrow contact portions 8 which extend radially of the bearing pad 1 for substantially the full radial length of the pad. The bearing pad 1 rests directly on the contact portions 8 so that it is supported by four generally parallel radial beam supports. Each of the beams 7 rests on one of the elastic portions 6 on a relatively narrow contact portion 9 which is shown for illustration as being integral with the beam 7 although it need not be a part of the beam. The loading on the bearing pad 1 is represented by the vectors 10 which represent an illustrative hydrodynamic loading such as may be applied to the pad 1 in a typical large thrust bearing, although it will be understood that other distributions of load may also occur.

Figure 2:
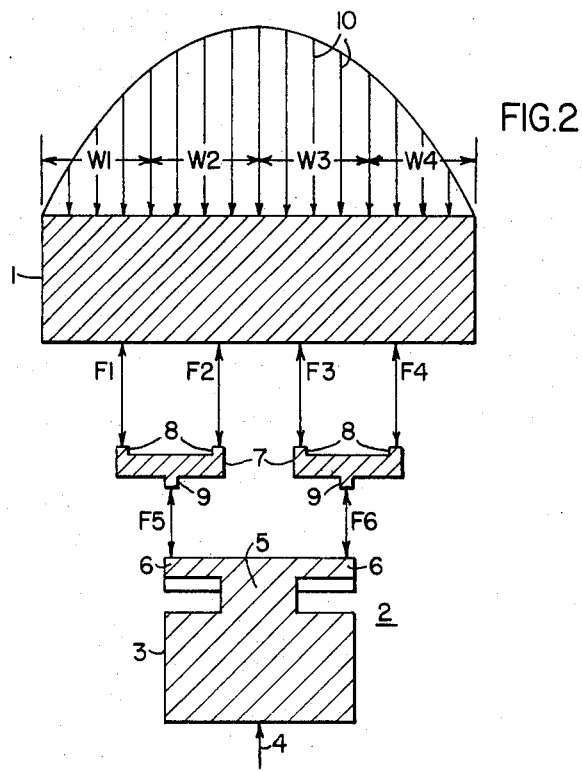
FIG. 2 is a diagram illustrating the forces and moments applied to the bearing pad and its support in the circumferential direction of the bearing.

FIG. 2 shows the forces on the bearing pad and support structure in the circumferential direction, that is, the direction of rotation of a thrust runner supported on the pad. As previously indicated, the pad 1 rests on the four narrow beam supports 8 which apply reaction forces F1, F2, F3, and F4 to the bottom of the pad 1. The loading on the bearing applies the forces indicated by the vectors 10 on the upper surface of the pad. In accordance with the invention, the hydrodynamic loading on the pad is divided into four equal sections indicated at W1, W2, W3, and W4. The supports 8 are arranged so that the reaction forces F1, F2, F3, and F4 are applied at the centers of gravity of the four resultant loadings W1, W2, W3, and W4, respectively, as shown in the drawing. The reaction forces are then equal and opposite to the corresponding resultant loads, and the forces and moments on the bearing pad 1 are in equilibrium and are effectively balanced. The result of this is that there is substantially no distortion of the pad in the circumferential direction, as the deflections due to the loads and the deflections due to the reaction forces are essentially equal and opposite, or at least differ only to a negligible degree, so that no substantial bending moments exist. Thus, any distortion of the pad surface in the circumferentia direction is negligibly small.

The lower contact portions 9 are preferably disposed approximately half-way between the upper contact portions 8, and the forces F5 and F6, which are applied through the contact portions 9 to the elastic portions 6 are the resultants of the reaction forces F1 and F2, and F3 and F4, respectively. It will be noted that any deflection of the beam members 7 relative to their contacts with the elastic portions 6 is immaterial as the beams can rotate slightly at these points as necessary, so that the bearing pad itself remains plane. Similarly, the thicknesses of the two beams 7 are not material and are not necessarily the same, so that the thicknesses can be determined to attain safe stress levels in both beams, and also to have equal deflection of the beams so as to minimize any rotation at their contact points with the elastic portions 6 and thus to eliminate wear and fretting at these contacts. The overall result therefore is that all forces and moments are essentially balanced and in equilibrium, and the bearing surface of the pad 1 has essentially zero deflection in the circumferential direction.

Figure 3A:
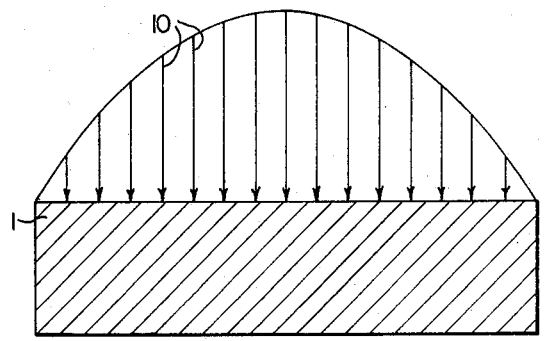
FIGS. 3A, 3B, and 3C are diagrams showing the loading and forces on the bearing pad and its supports in the radial direction.
Figure 3B:
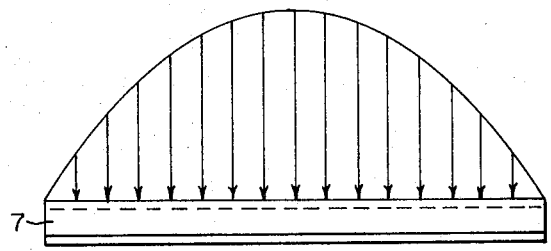
Figure 3C:
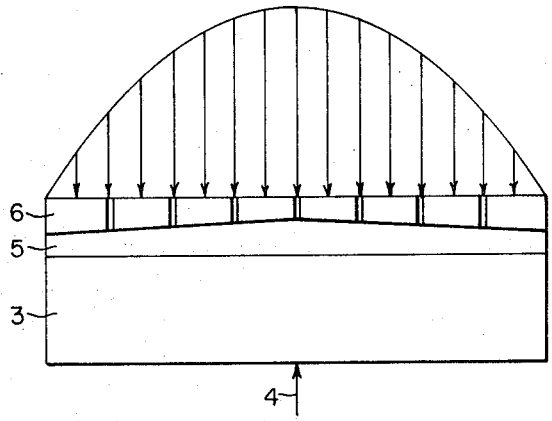

Referring now to FIG. 3, the forces acting on the support structure in the radial direction of the bearing pad are shown. In FIG. 3A, the forces applied to the bearing surface of the pad 1 are represented by the vectors 10 of FIG. 1 illustrating a typical hydrodynamic loading. The pad 1 rests on the beams 7, as described above, and the loading thus applied to the beams 7 in the radial direction is shown in FIG. 3B. The beams 7 in turn rest on the elastic portions 6 of the base member 2 and the combined loading on the two elastic portions 6, illustrated in FIG. 3C, is applied through the central portion 5 of the base member 2 to the bottom plate 3 which rests on the pivot 4. The bottom plate 3 is relatively rigid, but since it is supported only upon the pivot 4 approximately at its center, deflection of the plate 3 is effectively prevented at its center and increases towards each end of the plate where it is unsupported. Thus the maximum deflection of the plate 3 is at the ends and the deflection decreases to essentially zero at the center. The bottom plate 3 carries the elastic portions 6 which, as previously indicated, are designed to vary in elasticity or flexibility in the radial direction. Thus, as shown in the drawing, each of the elastic portions may comprise a series of cantilever beams of differing thickness so that they differ in stiffness or flexibility. The thinnest beams have the greatest flexibility and are shown as being at the center of the base member 2 while successive beams increase in thickness toward each end of the base member so that the elastic portions decrease in flexibility towards the ends. The elastic portions 6 are thus designed to compensate the deflection of the bottom plate 3, since the elastic portions 6 are most flexible at the center where the bottom plate 3 has the least deflection and are stiffer at the ends where the deflection of the bottom plate 3 is greatest. By proper design, therefore, it is relatively easy to determine the variation in flexibility of the elastic portions 6 in such a manner that they exactly compensate for the deflection of the bottom plate 3 and result in zero deflection of the bearing pad 1 in the radial direction. In other words, the bottom plate 3 tends to deflect downwards at the ends, while the load on the elastic portions is greatest at the center where they have greatest flexibility and is least at the ends where they are the stiffest. The deflection of the elastic portions, therefore, is greatest at the center and decreases toward the ends. The sum of the deflections of the bottom plate 3 and flexible portions 6 can, therefore, be made constant throughout the radial length of the support structure so that there is zero distortion of the flat supporting surfaces of the elastic portions 6 and beams 7.

The beam supports 7 maintain a straight line, undistorted support for the pad 1 in the radial direction as explained above, and the distortion of the pad in the circumferential direction is essentially zero, as previously explained. The bearing pad 1, therefore, has essentially no distortion and its bearing surface remains plane over its entire area. It will also be apparent that while the foregoing description has been in terms of the mechanical loading only, the design can also readily be such as to take into account any thermal gradients which may exist in the pad 1 so that distortion due to such gradients is also substantially eliminated.

Figure 4:
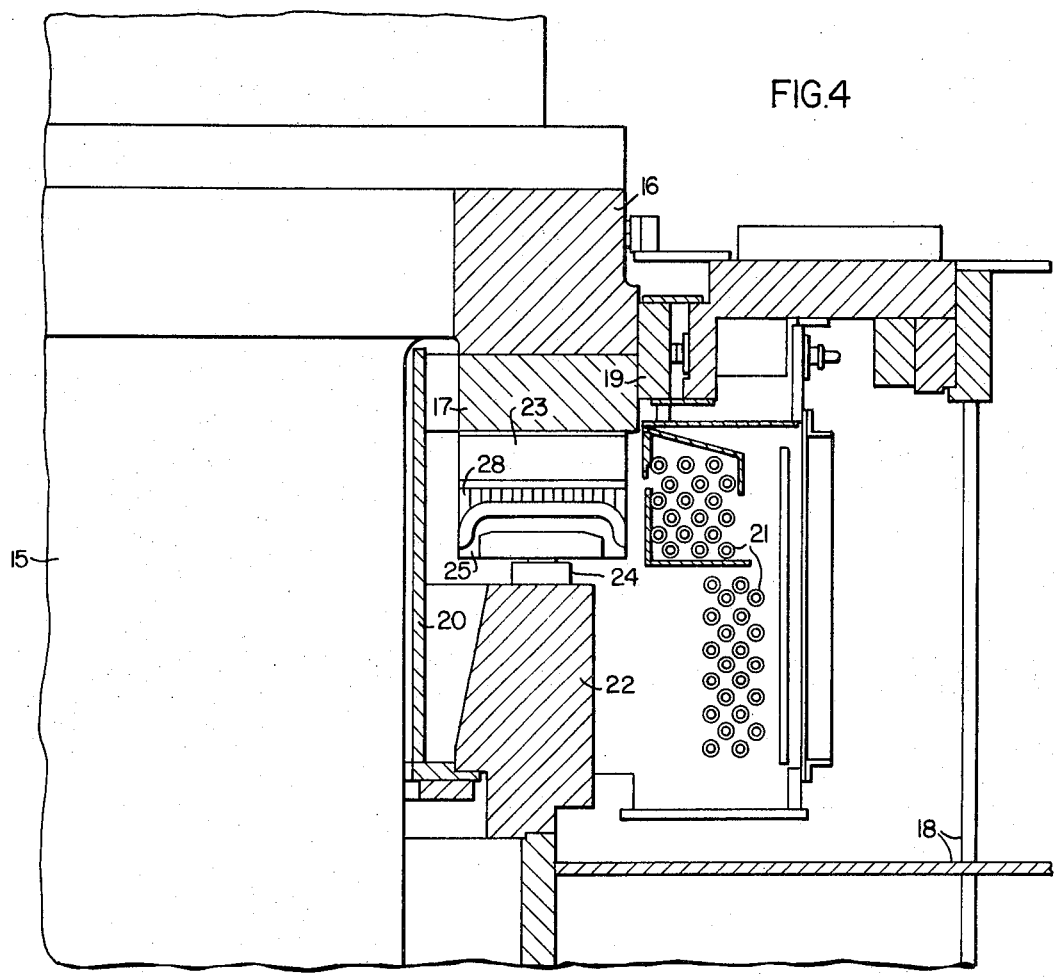
FIG. 4 is a vertical sectional view of a large thrust bearing embodying the invention.

An actual embodiment of the invention in a large thrust bearing is shown in FIGS. 4 through 7, although it will be understood that the invention might equally well be embodied in other structures. FIG. 4 shows a vertical sectional view of a large thrust bearing for supporting a vertical shaft 15 which may, for example, be the shaft of a large waterwheel generator and which is adapted to be connected at its upper end to the rotor of the generator. The shaft 15 carries a thrust block 16 and an annular thrust runner 17 is secured to the thrust block 16 in any suitable manner to rotate with the shaft.

The bearing may be supported in a supporting and enclosing structure 18 of any suitable type which rests on a foundation and which may also support the stator of the generator (not shown). Guide bearing shoes 19 may also be mounted on the structure 18 to engage a guide bearing surface on the thrust runner 17. A stand pipe 20 is mounted on the supporting structure 18 surrounding the shaft to form an annular oil chamber around the bearing which is normally filled with oil for lubricating the bearing. Oil cooling coils 21 of any suitable type are preferably also provided for removing heat from the oil.

Figure 6:
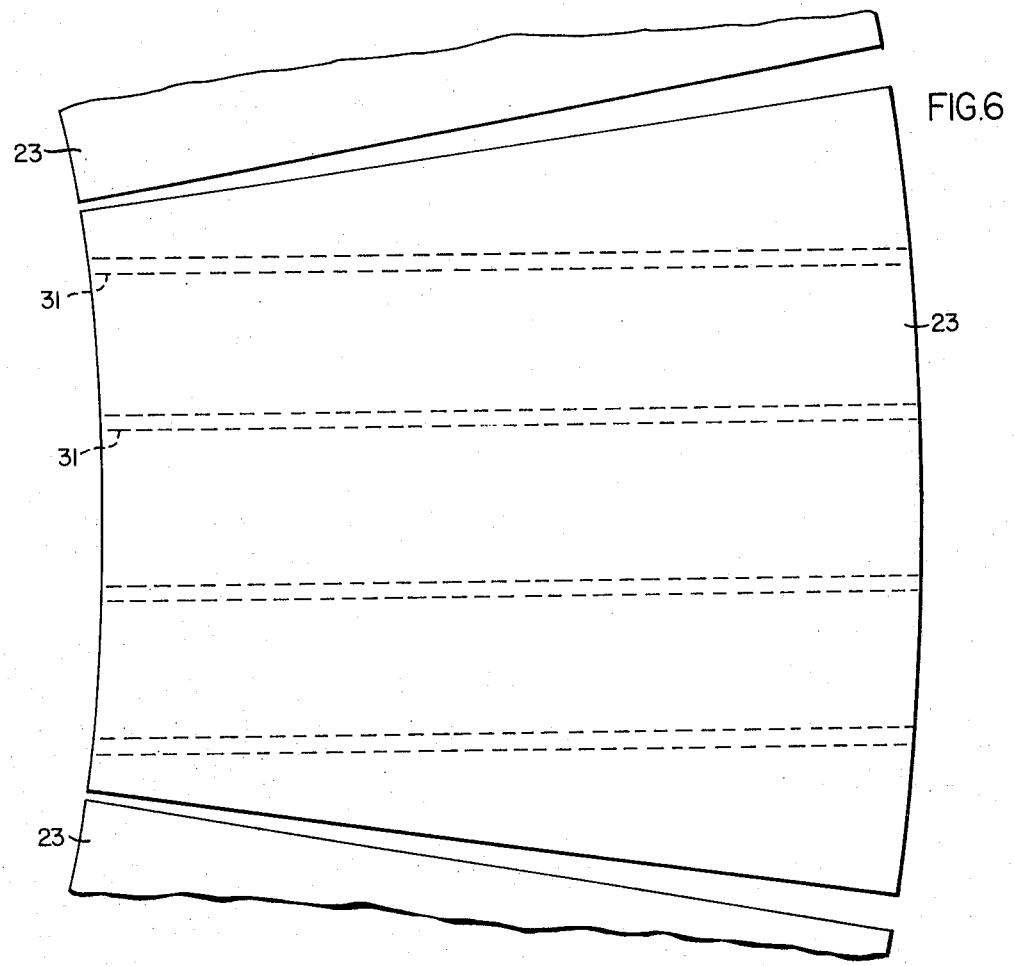
FIG. 6 is a fragmentary top plane view of the bearing.
Figure 5:
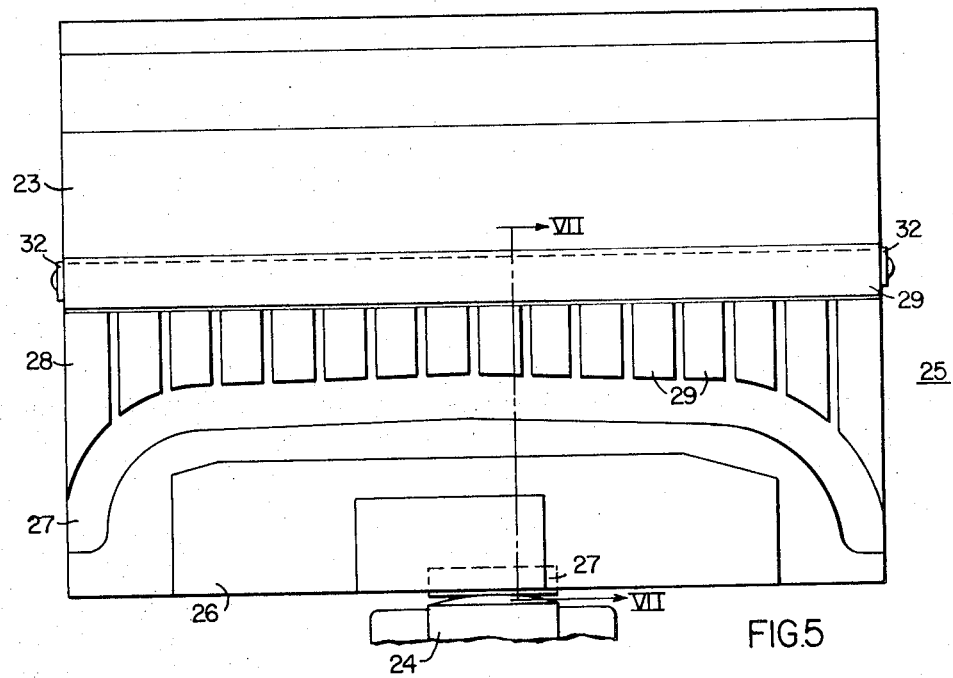
FIG. 5 is an enlarged side view of a bearing pad and its support.

A bearing support 22 is carried on the supporting structure 18 and may be an annular member surrounding the shaft 15. The bearing includes a plurality of segmental bearing pads 23 mounted for slight tilting movement on pivots 24, a suitable number of bearing pads being provided as indicated in FIG. 6. The pivots 24 for the bearing pads are carried on the support 22 and are preferably adjustably mounted to permit individual adjustment of the pivots to equalize the load between the pads.

Each of the bearing pads 23 is supported on its pivot 24 by a supporting structure of the type shown diagrammatically in FIG. 1 and described above. The supporting structure for each pad includes a base member 25 which has a bottom plate portion 26 having a hardened steel insert 27 at or near its center which rests on the pivot 24. The base member 25 has a recess 27 on each side defining a central portion between the recesses with elastic portions 28 extending from the central portion of each side. The base member 25 is of approximately the same radial length as the bearing pad 23 so that the elastic portions 28 extend for substantially the full radial length of the bearing pad. The elastic portions 28 are made of varying elasticity or flexibility from the center toward each end, as explained above, and as shown in the drawing this variation in elasticity is preferably obtained by forming the elastic portions 28 as a plurality of cantilever beams, indicated at 29, the beams being of varying depth so as to have different stiffness. The elastic portions 28 thus form a substantially continuous support throughout the radial length of the base member 25 but are of varying flexibility in the radial direction for the purpose explained previously.

A longitudinal beam 29 rests on each of the elastic portions 28. The beams 29 are also substantially equal to radial length of the pads 23 and rest on narrow contact portions 30 of the elastic portions 28. The contact portions 30 correspond to the contact portions 9 of FIG. 1, but in this instance they are made integral with the elastic portions 28. The function and effect, however, are as previously described. Each of the beams 29 has two narrow contact portions 31 on its upper surface extending longitudinally for the full length of the beam. The contact portions 31 thus form four generally parallel beam supports for the pad 23 which rests directly on them, and they are positioned with respect to the loading of the bearing pad 23 in the same manner as described above in connection with FIGS. 1 and 2. The bearing pad 23 rests directly on the supports 31 and may be retained in position by any suitable means such as by retaining plates 32 at each end of the beams 29. Similarly, any suitable means may be provided for restraining the bearing pads 23 and the supports from rotation and for retaining them in the desired position, the retaining means being of any suitable type which will permit the necessary slight tilting movement of the base members 25 on the pivots 24.

It will be seen that the structure of FIGS. 4 through 7 are essentially the same as that shown diagrammatically in FIG. 1 and that it operates in the manner previously described to support the bearing pad 23 on its pivot in such a manner that there is substantially no deflection of the bearing surface in either the circumferential or the radial direction. Thus, the bearing pad has substantially no distortion and the bearing surface remains plane for maximum load capacity.

Figure 7:
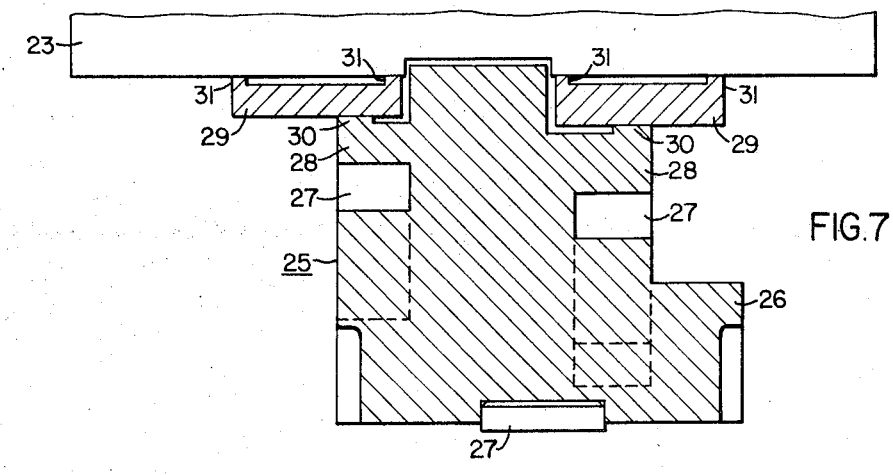
FIG. 7 is a transverse sectional view substantially on the line VII—VII of FIG. 5.

It will be apparent that although a particular embodiment has been shown and described for the purpose of illustration, the principles of the invention can be applied to other structures. Thus for example, it is not essential for the pivot to be at the center of the bottom plate since the deflection of the bottom plate can be readily calculated by known methods for any location of the pivot, and the varying flexibility of the elastic portions 28 determined accordingly to compensate for the deflection of the bottom plate as described previously. Similarly, the varying flexibility of the elastic support portions 28 can be obtained in any desired manner. As shown in the foregoing illustrative example, the elastic portions 28 are formed by a series of cantilever beams of varying depth or thickness but the variation in elasticity could also be obtained by using a series of cantilever beams of varying length to obtain the desired variation in flexibility. Similarly, other means might be used to provide an essentially continuous support which varies in flexibility from a point near the pivot towards each end of the base member. It will also be noted that the dimensions and elasticity of the two beams 29 and the two elastic portions 28 need not be the same, as previously indicated and as shown in FIG. 7.

It will be apparent that a relatively simple structure has been provided which can readily be produced and assemblied, but which supports a bearing pad on its pivot so that the bearing surface has essentially zero distortion in both directions.

I claim as my invention:

1. A thrust bearing assembly for a vertical shaft having a thrust runner thereon, said bearing assembly comprising segmental bearing pads disposed about the shaft and having bearing surfaces for engaging the thrust runner, a stationary pivot member for each bearing pad, support means for supporting each bearing pad on its pivot, each of said support means comprising two support members extending generally radially, each support member having two spaced upper contact portions on which the pad rests and each support member resting on a base member through another contact portion, said contact portions being narrow projections extending radially for substantially the radial length of the pad, said base member having a bottom plate portion resting on the pivot and carrying two generally radial elastic portions on which said support members rest, said elastic portions being substantially coextensive with the support members and varying in elasticity in the radial direction.

2. A thrust bearing assembly as defined in claim 1 in which the upper contact portions of said support members are positioned with respect to the bearing pad such that the reaction force applied to the pad by each contact portion is applied substantially in opposition to the resultant loading on a predetermined section of the pad.

3. A thrust bearing assembly as defined in claim 1 in which said elastic portion of the base member decreases in elasticity from the point nearest the pivot toward both ends of the bearing pad.

4. A thrust bearing assembly as defined in claim 1 in which the upper contact portions of said support members are positioned with respect to the bearing pad such that each contact portion applies a reaction force to the pad in opposition to the resultant loading on a one-fourth section of the pad, and said elastic portions of the base member decrease in elasticity from the point nearest the pivot toward each end of the pad.

5. A thrust bearing assembly as defined in claim 4 in which each of said elastic portions comprises a series of cantilever beam sections of varying stiffness.

6. In a thrust bearing assembly for a vertical shaft having a thrust runner thereon, a plurality of segmental bearing pads disposed about the shaft and a stationary pivot member for each bearing pad, a support means for each of said bearing pads comprising a base member having a bottom plate portion resting on the pivot, said bottom plate carrying two elastic portions extending generally radially, said elastic portions being substantially coextensive with the radial length of the bearing pad and varying in elasticity in the radial direction, and a radially extending support member resting on each of said elastic portions with a narrow area of contact therewith, each of said support members having two narrow contact portions on its upper surface, said contact portions being spaced apart and extending generally radially for substantially the entire length of the bearing pad, whereby four narrow, generally parallel supports are provided, the bearing pad resting directly on said supports.

7. The combination defined in claim 6 in which the contact portions of the support members are spaced apart transversely of the bearing pad such that each contact portion applies a reaction force to the pad in opposition to the resultant loading on a one-fourth section of the pad.

8. The combination defined in claim 6 in which said elastic portions have their miminum stiffness nearest the pivot and increase in stiffness toward both ends of the bearing pad.

9. The combination defined in claim 8 in which each of said elastic portions comprises a series of cantilever beams of varying depth.

10. The combination defined in claim 8 in which the contact portions of the support members are spaced apart transversely of the bearing pad such that each contact portion applied a reaction force to the pad in opposition to the loading on a predetermined section of the pad.

11. The combination defined in claim 6 in which said elastic portions increase in stiffness from the points nearest the pivots toward both ends of the pad and in which the narrow contact portions of said support members are spaced apart transversely of the pad such that each contact portion applies a reaction force to the pad directly in opposition to the resultant loading on a one-fourth section of the pad.

12. The combination defined in claim 11 in which each of said elastic portions comprises a series of cantilever beams extending transversely of the support members and increasing in depth towards the ends of the pad.

* * * * *